United States Patent
Date

(10) Patent No.: US 12,545,189 B2
(45) Date of Patent: Feb. 10, 2026

(54) VEHICLE RAMP DEPLOYMENT APPARATUS

(71) Applicant: TOYOTA JIDOSHA KABUSHIKI KAISHA, Toyota (JP)

(72) Inventor: Chihiro Date, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 562 days.

(21) Appl. No.: 18/101,790

(22) Filed: Jan. 26, 2023

(65) Prior Publication Data

US 2023/0242040 A1 Aug. 3, 2023

(30) Foreign Application Priority Data

Jan. 28, 2022 (JP) .................................. 2022-011759

(51) Int. Cl.
*B60R 3/02* (2006.01)
*A61G 3/06* (2006.01)

(52) U.S. Cl.
CPC ................ *B60R 3/02* (2013.01); *A61G 3/061* (2013.01); *A61G 3/067* (2016.11)

(58) Field of Classification Search
CPC ............ B60R 3/02; A61G 3/067; A61G 3/061
See application file for complete search history.

(56) References Cited

U.S. PATENT DOCUMENTS

| | | | | |
|---|---|---|---|---|
| 4,138,023 A | * | 2/1979 | Rohrs | B60P 1/4421 414/921 |
| 5,393,192 A | * | 2/1995 | Hall | B60P 1/431 296/61 |
| 2009/0274542 A1 | * | 11/2009 | Pocobello | A61G 3/061 414/522 |
| 2010/0037523 A1 | * | 2/2010 | Oirsouw | E05F 15/603 49/32 |
| 2019/0193620 A1 | * | 6/2019 | Matsuoka | B60K 7/0007 |
| 2020/0155385 A1 | * | 5/2020 | Darnaud | A61G 3/061 |
| 2021/0245649 A1 | | 8/2021 | Maeda et al. | |

FOREIGN PATENT DOCUMENTS

| | | |
|---|---|---|
| JP | 2018-144774 A | 9/2018 |
| JP | 2021-126956 A | 9/2021 |

* cited by examiner

*Primary Examiner* — Christopher J Sebesta
(74) *Attorney, Agent, or Firm* — Dinsmore & Shohl LLP

(57) ABSTRACT

A vehicle ramp deployment apparatus is mounted on a vehicle, for deploying a ramp from a vehicle body and retracting the ramp into the vehicle body. The vehicle ramp deployment apparatus includes an electric motor configured to drive the ramp for a deploying or retracting operation, an ECU configured to execute driving control of the electric motor and to execute stop retaining control of the electric motor to retain a stopped state of the electric motor, and a pulse sensor configured to detect rotation of the electric motor. The ECU is configured to shift from the stop retaining control to power save control in response to detection, with the rotation sensor, of the electric motor having not been rotated for a predetermined time period.

4 Claims, 5 Drawing Sheets

VEHICLE RAMP DEPLOYMENT APPARATUS

CROSS REFERENCE TO RELATED APPLICATION

This application claims priority to Japanese Patent Application No. 2022-011759 filed on Jan. 28, 2022, which is incorporated herein by reference in its entirety including the specification, claims, drawings, and abstract.

TECHNICAL FIELD

The present disclosure relates to a ramp deployment apparatus mounted on a vehicle for deploying or retracting a ramp.

BACKGROUND

A vehicle ramp deployment apparatus includes a ramp deployment apparatus that deploys a ramp from a vehicle body and retracts the ramp into the vehicle body (see JP 2018-144774 A, for example). A ramp deployment apparats is driven by an electric motor, itself driven using electric power from a battery mounted on the vehicle. After the ramp has been deployed, control is executed to stop the electric motor that drives the ramp and retain the stopped state of the electric motor (hereinafter referred to as "stop retaining control").

SUMMARY

Vehicles with a mounted ramp may be used as retail venues for selling various products displayed therein. When such a ramp-mounted vehicle is used as a retail store, the ramp remains deployed for a long time. This ramp-deployed state where the stop retaining control is continuously executed consumes a significant amount of power from the battery, which can create a battery power shortage.

An aspect of this disclosure is therefore aimed at providing a vehicle ramp deployment apparatus that avoids causing a battery power shortage by long-time deployment of a ramp.

In accordance with an aspect of the disclosure, a vehicle ramp deployment apparatus mounted on a vehicle, for deploying a ramp from a vehicle body and retracting the ramp into the vehicle body, includes an electric motor configured to drive the ramp for deploying or retracting operation, a controller configured to execute driving control of the electric motor and to execute stop retaining control of the electric motor to retain a stopped state of the electric motor, and a rotation sensor configured to detect rotation of the electric motor. The controller is configured to, in response to detection with the rotation sensor of the electric motor having not been rotated for a predetermined time period, shift to power save control from the stop retaining control.

The above configuration prevents execution of the stop retaining control in which the electric motor is stopped and retained, in response to the electric motor being kept unrotated for a predetermined time period, thereby reducing power consumption.

The vehicle may further include a battery for travelling, and the electric motor may be driven with electric power of the battery.

The ramp-mounted vehicle according to the disclosure avoids battery power shortage caused by long-time deployment of the ramp.

BRIEF DESCRIPTION OF DRAWINGS

An embodiment of the present disclosure will be described by reference to the following figures, wherein.

DESCRIPTION OF EMBODIMENTS

An example embodiment will be described below. In the following, specific shapes, materials, directions, or numeral values, for example, are examples to facilitate understanding of the disclosure and may therefore be changed in accordance with use, purposes, or specifications, for example.

Vehicle

Figure 1:
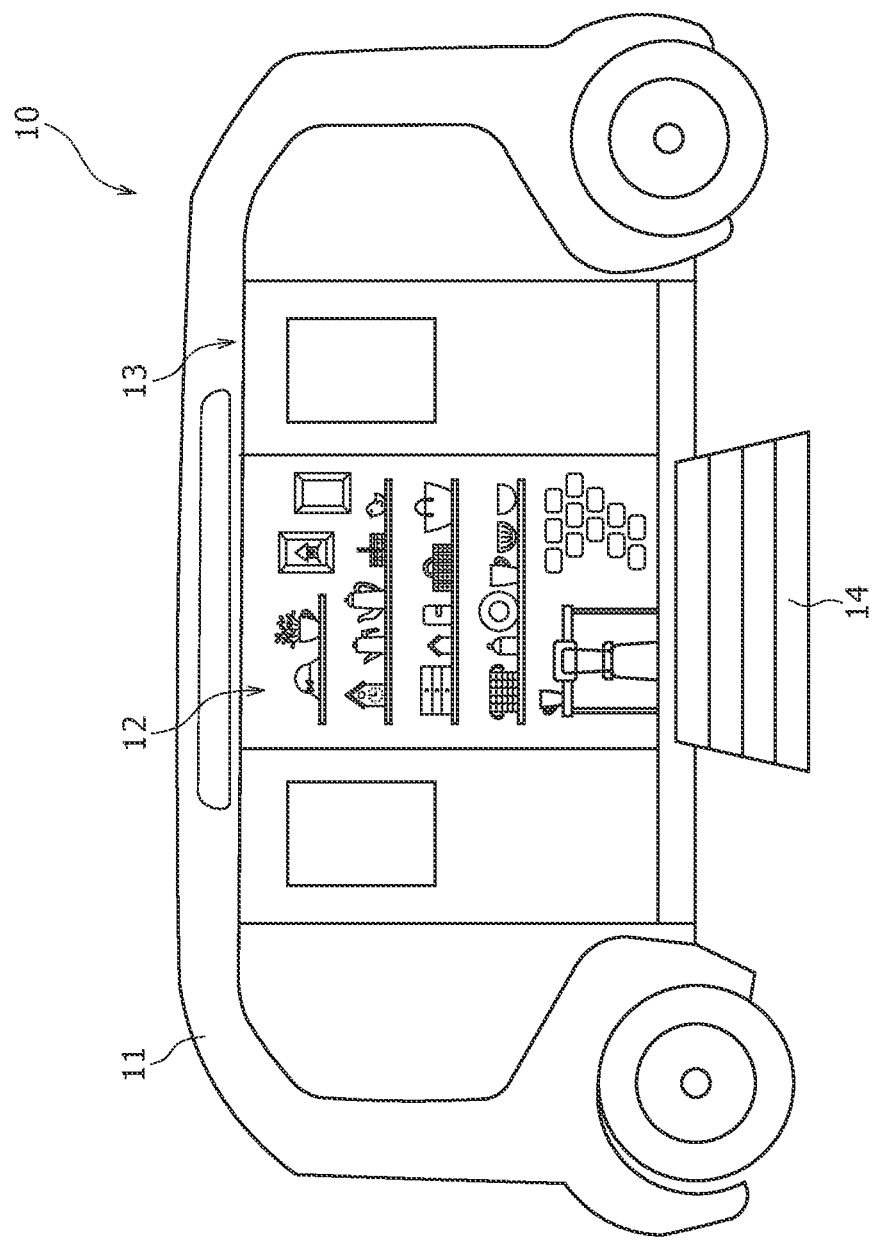
FIG. 1 schematically illustrates a vehicle including a ramp deployment apparatus according to an embodiment.
Figure 2:
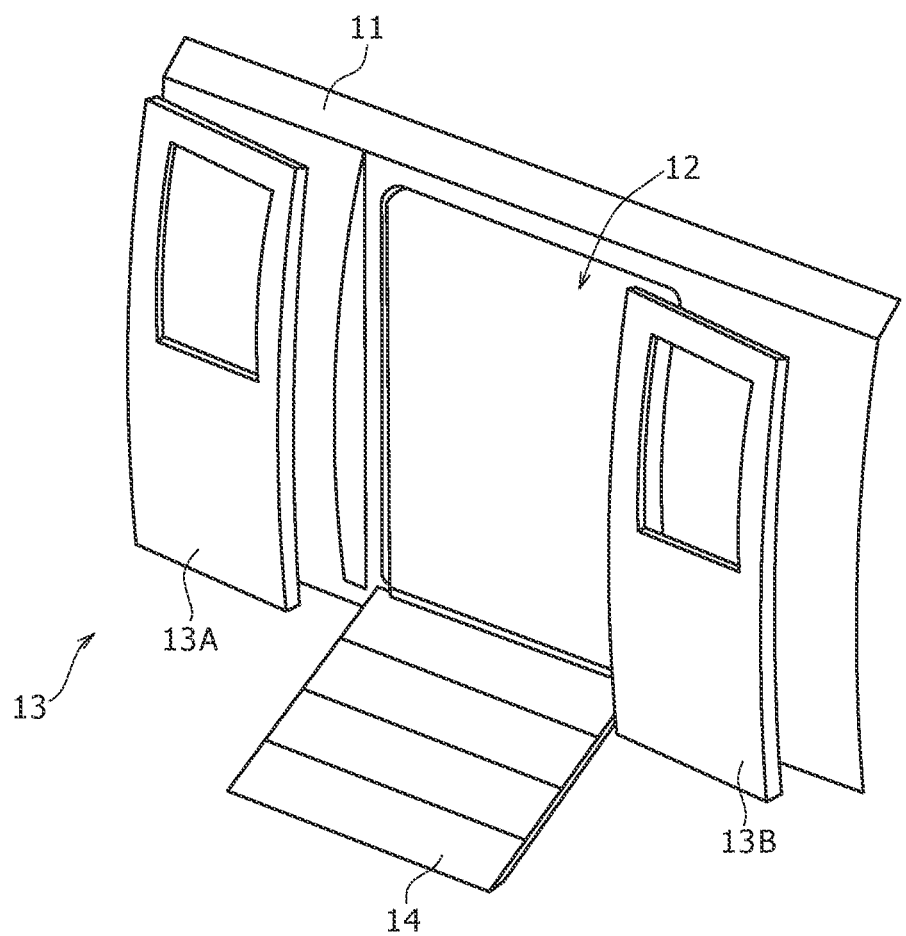
FIG. 2 is a perspective view illustrating a state where a ramp has been deployed from the vehicle.

Referring to FIG. 1 and FIG. 2, a vehicle 10 according to an example embodiment will be described.

The vehicle 10, a ramp-mounted vehicle, is a battery electric vehicle (BEV) having a rectangular parallelepiped shape and is capable of automatic operation. Specifically, the vehicle 10 can travel in a plurality of driving modes including an autonomous driving mode and a manual driving mode.

The vehicle 10 is a battery electric vehicle (BEV) including, as a drive source, an electric motor for travelling, which will be hereinafter referred to as a "travelling electric motor". While in this embodiment, the vehicle 10 is a BEV, the vehicle 10 may be an engine vehicle having an internal combustion engine as a drive source, or a hybrid electric vehicle (HEV) including both a travelling electric motor and an internal combustion engine as drive sources.

As illustrated in FIG. 1, the vehicle 10 is used as a retail store for selling various products displayed therein. The vehicle 10 is used as a shop with a ramp 14, which will be described below, being deployed or being halfway deployed.

The vehicle 10 may be used as a shop, such as a restaurant that provides cooked food. The vehicle 10 may further be used as a passenger bus for a large number of occupants, as an office for business tasks or meeting with customers, as a taxi for transporting customers or packages, or as a transportation vehicle. Also, the vehicle 10 may be used not only for business purposes, but also as personal transportation.

As illustrated in FIG. 2, the vehicle 10 includes a sliding door 13 for opening and closing an entrance 12 disposed on a side of a vehicle body 11, and a ramp 14 disposed under the sliding door 13 to facilitate loading and unloading of a wheelchair, for example.

The sliding door 13 comprises two door panels 13A and 13B that slide opposite directions to open or close the entrance 12. The door panels 13A and 13B are opened or closed by a door opening and closing device (not shown). In the present embodiment, the vehicle 10 is used as a shop with the sliding door 13 being open.

The ramp 14 is normally stored under the floor of the vehicle body 11, and is deployed by extending outward (diagonally downward toward left in the drawing) as illustrated in FIG. 2 for boarding or getting off. As described above, the vehicle 10 is used as a shop with the ramp 14 being deployed. The ramp 14 is retracted and deployed by a ramp deployment apparatus 20, which will be detailed below.

Ramp Deployment Apparatus

Figure 3:
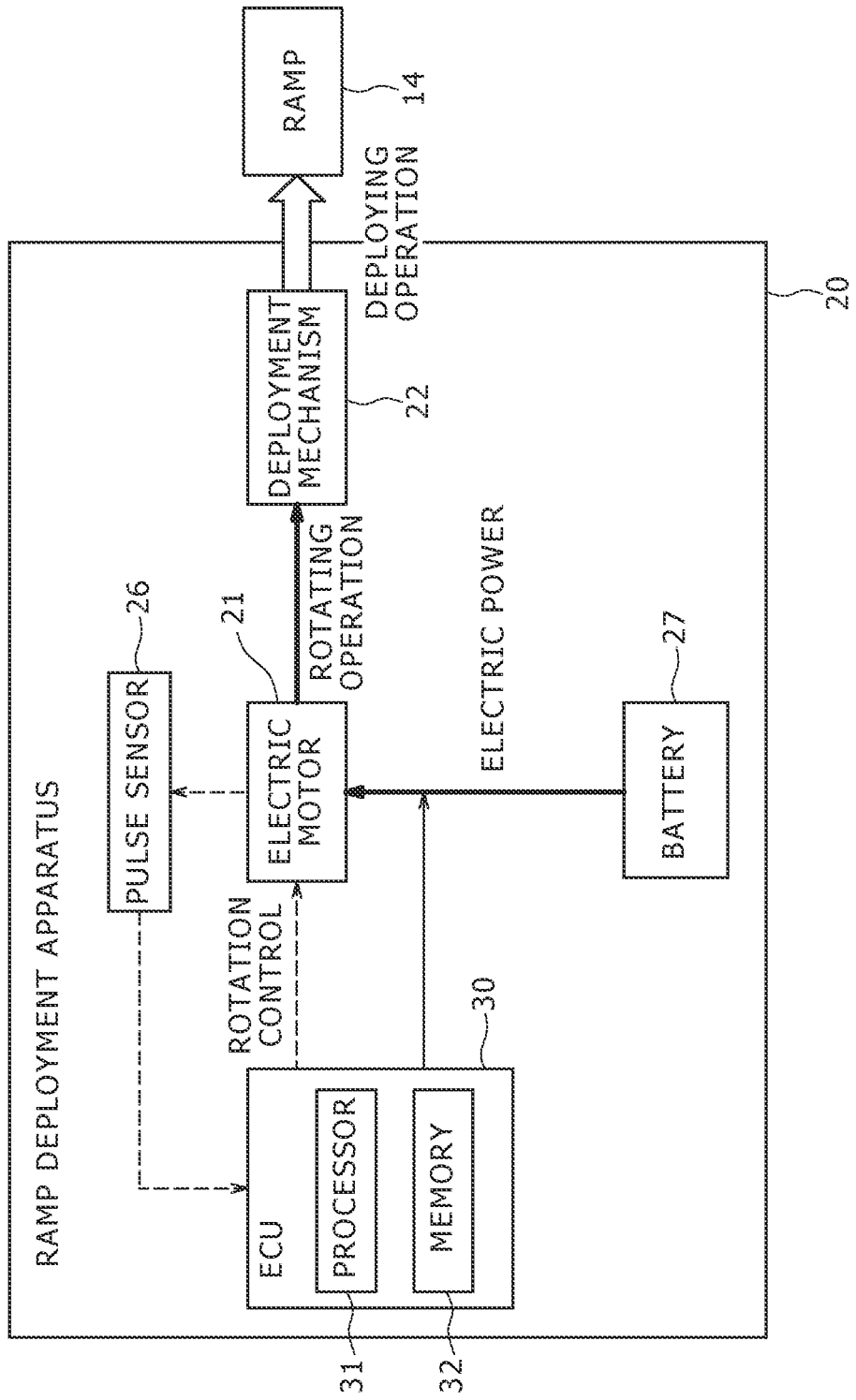
FIG. 3 is a block diagram illustrating the configuration of a ramp deployment apparatus according to an embodiment.
Figure 4:
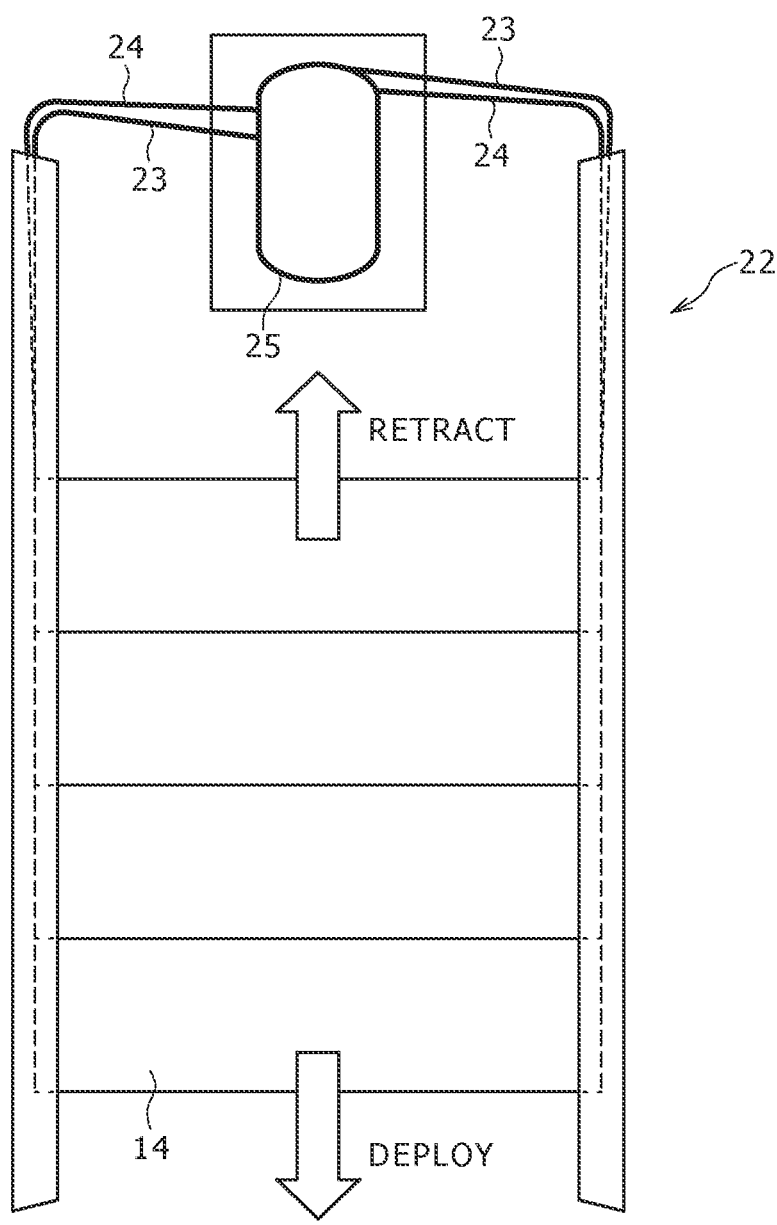
FIG. 4 schematically illustrates a deployment mechanism.

Referring to FIG. 3 and FIG. 4, the ramp deployment apparatus 20 will be described.

As illustrated in FIG. 3, the ramp deployment apparatus 20 includes a deployment mechanism 22 for deploying or retracting the ramp 14 as described above, a pulse sensor 26 or a rotation detector that detects the rotation speed of an electric motor 21 that is a drive source for the deploying or retracting operation, a battery 27 that supplies electric power to the electric motor 21, and an electronic control unit (ECU) 30 or control unit that executes driving control of the electric motor 21 and stop retaining control of the electric motor 21 for stopping and retaining the electric motor 21.

Receiving electric power from the battery 27, the electric motor 21 drives the ramp 14 for a deploying or retracting operation. In the present embodiment, the electric motor 21 is a three-phase brushless motor, for example.

As illustrated in FIG. 4, the deployment mechanism 22 converts the rotation driving of the electric motor 21 to the deploying and retracting operation of the ramp 14. The deployment mechanism 22 includes a deploying cable 23 coupled with the ramp 14, a retracting cable 24 coupled with the ramp 14, and a winder 25 to be driven by the electric motor 21 to allow wind-up of the deploying cable 23 and the retracting cable 24.

Forward rotation of the electric motor 21 enables the deployment mechanism 22 to feed the deploying cable 23 wound around the winder 25 to thereby deploy the ramp 14. Meanwhile, reverse rotation of the electric motor 21 enables the deployment mechanism 22 to take up the retracting cable 24 around the winder 25 to thereby store the ramp 14.

As illustrated in FIG. 3, the pulse sensor 26 detects the rotation speed of the electric motor 21. The pulse sensor 26 is disposed adjacent to a rotation shaft of the electric motor 21 and is connected with the ECU 30.

The battery 27 supplies electric power to the electric motor 21. The battery 27 may be a battery powering travelling of the vehicle 10, a battery that supplies electric power only to the door opening and closing device and the ramp deployment apparatus 20, or a battery that supplies electric power only to the ramp deployment apparatus 20.

The ECU 30 executes driving control of the electric motor 21 and stop retaining control of the electric motor 21 to retain the electric motor 21 in a stopped state. The ECU 30 includes a processor 31 including a CPU, a control program, and a memory 32 storing control data, for example. The memory 32 is RAM, ROM, or flash memory, for example. The processor 31 operates according to the control program stored in the memory 32 to thereby execute the driving control and the stop retaining control of the electric motor 21.

The processor 31, in response to movement of the ramp 14 caused by an external force acting on the ramp 14 during deployment of the ramp 14 or during the stopped state of the ramp 14 after being deployed, executes control to retain the stopped state against the external force, which will be hereinafter referred to as "stop retaining control".

Specifically, under the stop retaining control, upon detection, with the pulse sensor 26, of a shift in the rotation shaft of the electric motor 21 generated by an external force acting on the ramp 14, the processor 31 causes electric current to flow in the electric motor 21 to generate torque against the external force so as to correct the shift in the rotation shaft, thereby executing control to retain the ramp 14 in a stopped state.

Detection of stop or rotation of the electric motor 21 with the pulse sensor 26 thus enables the processor 31 to detect the stopped state or the amount of movement (including the deploying or retracting operation) of the ramp 14.

The processor 31, in response to elapse of a predetermined time during which the ramp 14 is in the stopped state, shifts the control from the stop retaining control to power save control.

Specifically, under the power save control, the processor 31, in response to elapse of a predetermined time period in which the electric motor 21 remains stopped, stops generating torque against the external force by preventing the electric current to flow to the electric motor 21 to correct the shift of the rotation shaft.

As described above, in response to the electric motor 21 having not rotated for a predetermined time period, the processor 31 prevents execution of the stop retaining control, thereby reducing power consumption of the battery 27. The power save control thus prevents power shortages of the battery 27.

Ramp Deployment Control

Figure 5:
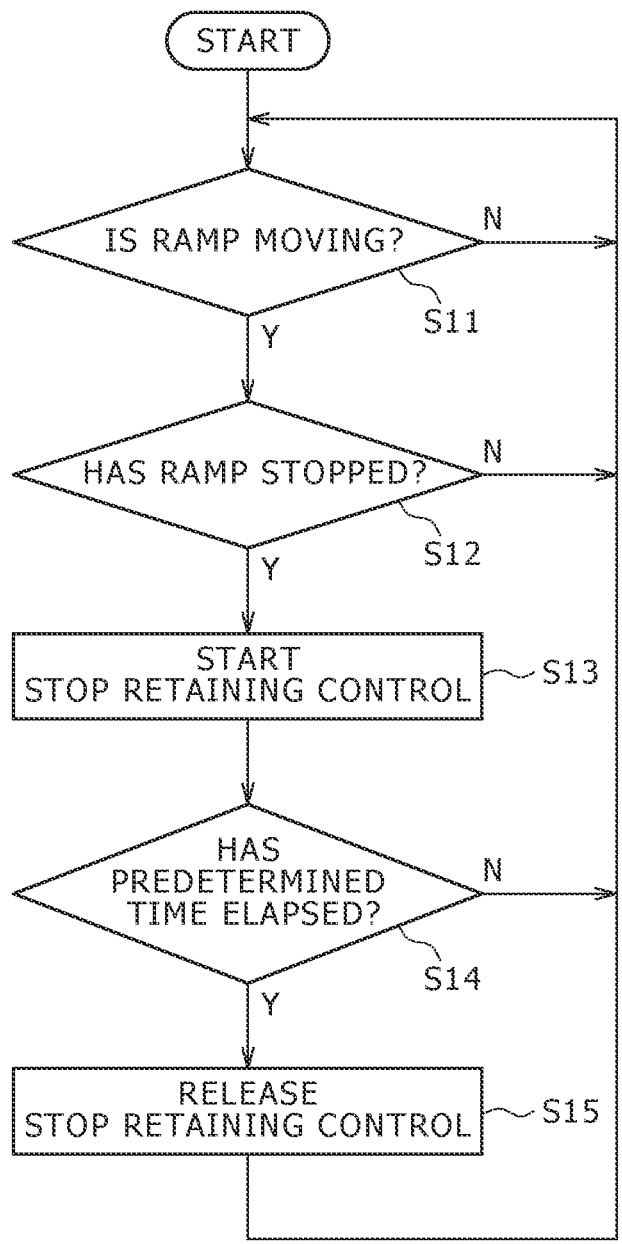
FIG. 5 is a flowchart showing a ramp deployment control flow.

Referring to FIG. 5, ramp deployment control executed by the ramp deployment apparatus 20 will be described.

In step S11, the processor 31 determines whether the ramp 14 is moving or is in the middle of a deploying or retracting operation. If the ramp 14 is moving, the process proceeds to step S12. In step S12, the processor 31 determines whether the ramp 14 has stopped. Here, "having stopped" includes an instance of having stopped in the middle of the deploying or retracting operation. In response to the ramp 14 having stopped, the process proceeds to step S13. In response to the ramp 14 moving, the process returns to step S11.

In step S13, the processor 31 executes the stop retaining control described above to retain the stopped state of the electric motor 21. In step S14, the processor 31 determines whether the stop retaining control has continued for a predetermined time period. In response to determination that the predetermined time period has elapsed, the process proceeds to step S15.

In step S15, the processor 31 releases the stop retaining control and shifts to the power save control. The power save control enables reduction in power consumption of the battery 27, to thereby avoid creating a shortage of power from the battery 27.

The present disclosure is not limited to the embodiment described above or its modification examples, and various changes and improvements may be made within the scope of the features described in the claims of the present application.

The invention claimed is:

1. A vehicle ramp deployment apparatus mounted on a vehicle, for deploying a ramp from a vehicle body and retracting the ramp into the vehicle body, the vehicle ramp deployment apparatus comprising:
   an electric motor configured to drive the ramp for deploying or retracting operation;
   a controller configured to execute driving control of the electric motor and to execute stop retaining control of the electric motor to retain a stopped state of the electric motor; and
   a rotation sensor configured to detect rotation of the electric motor, wherein the controller is configured to, in response to detection, with the rotation sensor, of the electric motor having not been rotated for a predetermined time period, shift to power save control from the stop retaining control, and the controller is configured to cause an electric current to flow in the electric motor to generate torque that acts against an external force acting on the ramp when executing the stop retaining control.

2. The vehicle ramp deployment apparatus according to claim 1, wherein the vehicle further comprises a battery for travelling, and the electric motor is driven with electric power of the battery.

3. A vehicle ramp deployment apparatus mounted on a vehicle, for deploying a ramp from a vehicle body and retracting the ramp into the vehicle body, the vehicle ramp deployment apparatus comprising:

an electric motor configured to drive the ramp for deploying or retracting operation;

at least one cable configured to be coupled to the ramp; and a winder coupled to the at least one cable and rotated by the electric motor for deploying and retracting the ramp;

a controller configured to execute driving control of the electric motor and to execute stop retaining control of the electric motor to retain a stopped state of the electric motor; and a rotation sensor configured to detect rotation of the electric motor, wherein the controller is configured to, in response to detection, with the rotation sensor, of the electric motor having not been rotated for a predetermined time period, shift to power save control from the stop retaining control.

4. The vehicle ramp deployment apparatus according to claim 3, wherein the vehicle further comprises a battery for travelling, and the electric motor is driven with electric power of the battery.

* * * * *